UNITED STATES PATENT OFFICE.

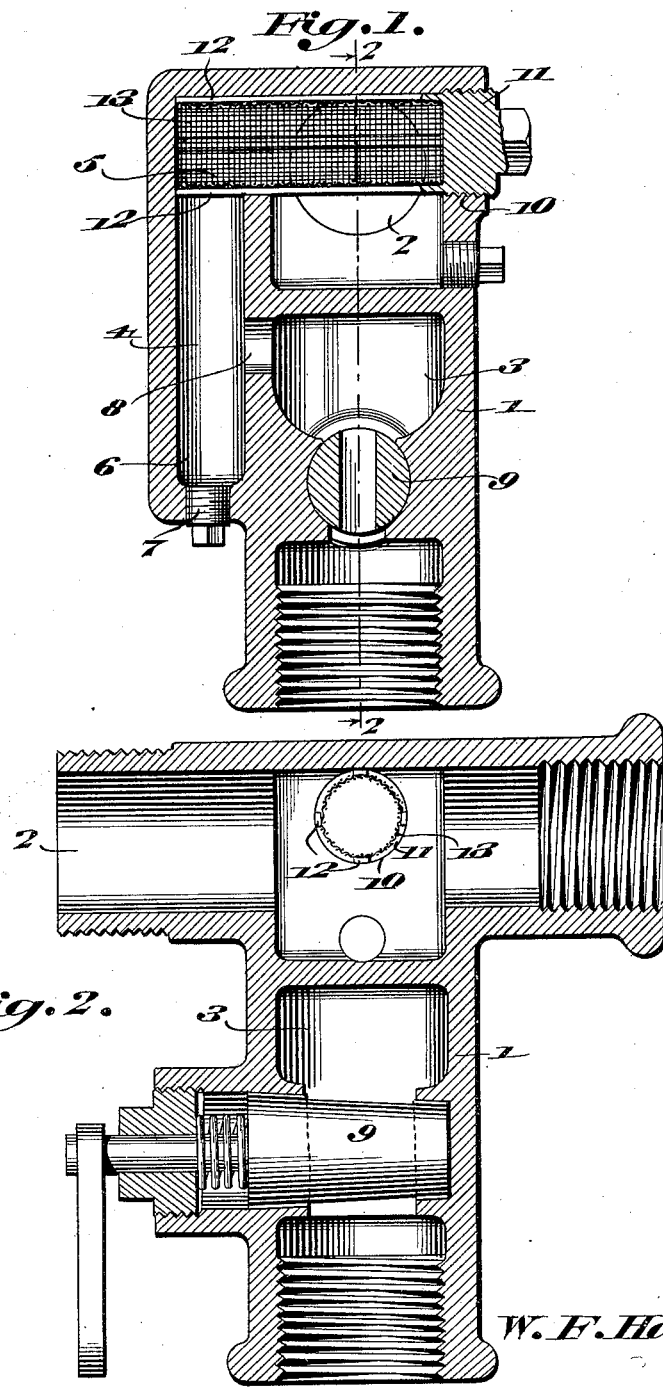

WALTER F. HAMMOND, OF ROCKY MOUNT, NORTH CAROLINA, ASSIGNOR OF ONE-HALF TO LEON GRIMES, OF ROCKY MOUNT, NORTH CAROLINA.

CROSSOVER CONNECTION FOR FLUID-BRAKE SYSTEMS.

1,092,043.  Specification of Letters Patent.  Patented Mar. 31, 1914.

Application filed November 11, 1913. Serial No. 800,348.

*To all whom it may concern:*

Be it known that I, WALTER F. HAMMOND, a citizen of the United States, residing at Rocky Mount, in the county of Edgecombe and State of North Carolina, have invented new and useful Improvements in Crossover Connections for Fluid-Brake Systems, of which the following is a specification.

This invention relates to improvements in cross over connections for air brake systems, and although my invention is practically adapted for this purpose I wish it to be understood that the device, in its useful application, is not limited to this purpose, but may be used wherever in a fluid pressure brake system it may be found necessary or desirable.

In carrying out the present invention it is my purpose to provide a cross over from the train line air pipe to the triple valve which will embody a casing having a horizontal train line air passage therethrough and a vertical conduit therein terminating in a dust pocket and communicating with the train line air passage by way of a screen or filter, a valve chamber communicating at one end with the conduit and having the opposite end thereof adapted for connection with the triple valve, a cut-out valve being located in said chamber whereby communication between the train line and the triple side of the casing may be cut off whenever necessary, the screen between the train line and the conduit protecting the cut-out valve against abrasion and clogging from the dust laden air currents which surge back and forth through the train line.

It is also my purpose to provide a cross over connection between the train line and the triple valve which will embrace the desired features of simplicity, efficiency and durability and which may be installed and maintained at a minimum expense.

With the above recited objects, and others of a like nature in view, the invention consists in the construction, combination and arrangement of parts hereinafter fully set forth in and falling within the scope of the claims.

In the accompanying drawing: Figure 1 is a sectional view at right angles to the line of the brake pipe of my improved cross over connection. Fig. 2 is a sectional view on the line 2—2 of Fig. 1.

Referring now to the accompanying drawing in detail the numeral 1 designates a casing formed with a horizontal train line air passage 2 adjacent to the upper end thereof and with a valve chamber 3 immediately below the passage 2 and at the opposite end of the casing.

The numeral 4 designates a vertical conduit formed in the casing 1 at one side of the passage 2 and the valve casing 3 and having the upper end thereof in communication with the passage 3 as at 5 and the lower end formed to provide a dust pocket 6 having the lower wall thereof formed with a threaded aperture in which is mounted a removable plug 7 by means of which access may be had to the interior of the dust pocket and the latter relieved of any dust therein. At a point approximately centrally of its length the conduit 4 is formed with a port 8 opening into the upper end of the valve chamber 3, while the lower end of such chamber is adapted for connection with the triple valve of the air brake system. Rotatably mounted within the valve chamber 3 is the usual form of turn plug 9 adapted when in one position to cut off communication between the train line and the triple side of the casing and in another position to establish communication between the train line and the triple valve side of the casing.

The side wall of the casing 1 opposite from the port establishing communication between the conduit 4 and the train line passage 2 is formed with a threaded aperture 10 in which is mounted a plug 11 provided with an annular series of fingers 12 extending into the casing and through the port 5 and mounted within the fingers 12 is a tubular screen 13 designed to prevent the passage of dirt and cinders through the conduit 4 and into the valve chamber.

From the foregoing description taken in connection with the accompanying drawing the construction and manner of employing my invention will be readily apparent. It will be seen that I have provided a cross over connection for fluid pressure brake systems which embodies a strainer and cut-out valve so arranged and correlated as to reduce the possibility of derangement to a minimum and while the screen prevents dust, cinders, scale and the like from passing to the triple valve mechanism and the cut-out valve thereby effectually protecting the latter from the grit laden air current which surges back and forth through the train line air pipe.

I claim:

1. A cross over connection for fluid pressure brake systems comprising a casing having a horizontal train line air passage therethrough, a vertical conduit in said casing terminating in a dust pocket, a valve chamber in communication at one end with said conduit and having the opposite end thereof adapted for connection with the triple valve, a valve in said valve chamber, a plug closing said dust pocket and removable therefrom and a screen interposed between said conduit and train line air passage.

2. A cross over connection for fluid pressure brake systems comprising a casing having a horizontal train line passage therethrough, a vertical conduit in said casing terminating in a dust pocket, a valve chamber communicating at one end with said conduit and having the opposite end thereof adapted for connection with the triple valve, a cut-off valve in said valve chamber, a plug closing said dust pocket and removable therefrom, a screen interposed between said train line air passage and conduit, a plug threaded into the side wall of said casing in alinement with the point of communication between said conduit and train line air passage, an annular series of fingers carried by said plug and extending through the port between the conduit and the train line air passage and carrying said screen.

In testimony whereof I affix my signature in presence of two witnesses.

WALTER F. HAMMOND.

Witnesses:
A. W. ARRINGTON,
J. J. WILKINS.

---

Copies of this patent may be obtained for five cents each, by addressing the "Commissioner of Patents, Washington, D. C."